No. 734,368. PATENTED JULY 21, 1903.
F. REYNOLDS.
SHAFT SUPPORT.
APPLICATION FILED OCT. 29, 1902.
NO MODEL.

Witnesses
Alfred A. Eicks
M. S. Iron

Inventor
Frank Reynolds
by Higdon & Longan Attys.

No. 734,368. Patented July 21, 1903.

UNITED STATES PATENT OFFICE.

FRANK REYNOLDS, OF ST. LOUIS, MISSOURI.

SHAFT-SUPPORT.

SPECIFICATION forming part of Letters Patent No. 734,368, dated July 21, 1903.

Application filed October 29, 1902. Serial No. 129,261. (No model.)

*To all whom it may concern:*

Be it known that I, FRANK REYNOLDS, of the city of St. Louis, State of Missouri, have invented certain new and useful Improvements in Shaft-Supports, of which the following is a full, clear, and exact description, reference being had to the accompanying drawings, forming a part hereof.

My invention relates to improvements in shaft-supports.

It has for its object to provide an improved rack or support by which the shafts of the vehicle will be held up from the ground in order to economize space, as when the vehicle is to be stored in a small shed.

My invention consists in the form and protective facing of my supporter and will be more readily understood by reference to the accompanying drawings, which form part of this specification, and in which—

Figure 1:
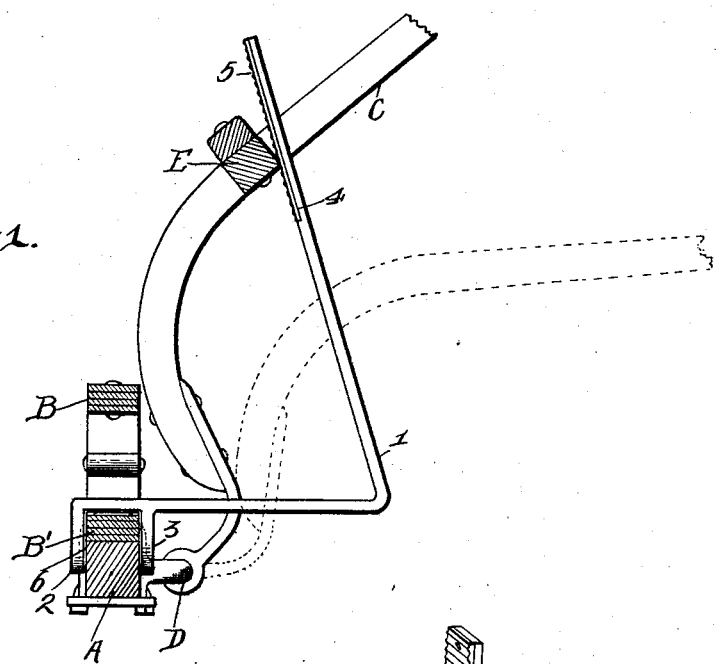
Figure 2:
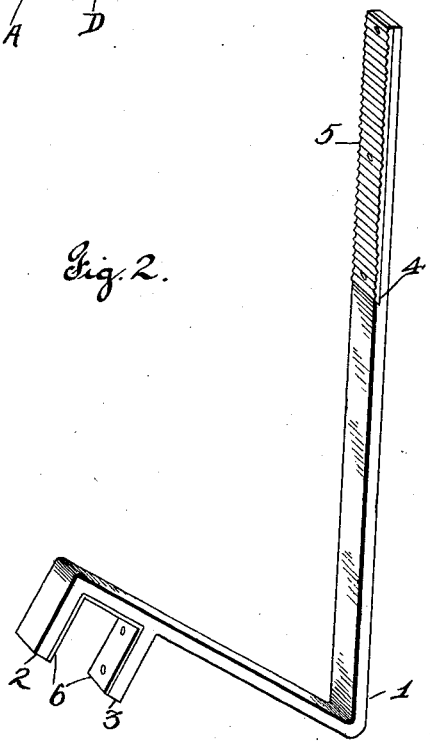

Figure 1 is a side view of my shaft-supporter when in use. Fig. 2 is a perspective of my shaft-supporter.

My shaft-supporter consists of the angular bar 1, having a horizontal arm or base and which is provided upon its base with the depending lugs 2 and 3. The back surface of the upper end of the bar 1 is recessed, as shown at 4, in order to admit of the insertion and attachment to the bar 1 of a protective strip 5, which may be made of any resilient substance. The inner sides of the lugs 2 and 3, together with the inner connecting-surface between them, is provided with the protective strip 6, which is made of any desired resilient material. The function of the resilient strips 5 and 6 is to prevent the abrasion of the painted or varnished surface of the axle and shaft of the vehicle upon which it is used.

The manner in which my shaft-supporter is used is as follows: In Fig. 1, A represents the front axle of a vehicle B. B' indicates the vehicle-spring in section. C is one of the shafts of the vehicle connected to the axle A by the hinge D. E is the transverse swingletree-bar connecting the shaft C with the other shaft. (Not shown.) When the vehicle is drawn into the shed or other repository where it is to be stored, the operator throws the shaft C upward from the position indicated by the dotted lines in Fig. 1 to the upper position, which is shown in Fig. 1, or a little higher. The horizontal arm of the bar 1 is then placed in position over the spring B', so that the lug 2 fits over the back and the lug 3 fits over the front of the spring. The supporter is then in position, as shown in Fig. 1, having its upper extremity in front of the transverse bar E, with which it engages when the shaft C is released by the operator.

Having thus described my invention, what I claim as new, and desire to have secured to me by the grant of Letters Patent, is—

1. The improved shaft-supporter, consisting of an angular bar having a horizontal arm provided with depending lugs 2 and 3 adapted to fit over and upon the axle of a vehicle, substantially as and for the purposes specified.

2. The improved shaft-supporter for vehicles, consisting of the angular bar 1, having a horizontal arm adapted to fit over and be mounted upon the axle of the vehicle, depending lugs 2 and 3 below said horizontal arm, the upper part of said bar having the recess 4, and a resilient strip 5 mounted in said recess, substantially as and for the purposes specified.

In testimony whereof I affix my signature in presence of two witnesses.

FRANK REYNOLDS.

Witnesses:
EDWARD E. LONGAN,
ALFRED A. EICKS.